March 26, 1929. W. G. NEWTON 1,706,630
REGULATING VALVE
Filed June 9, 1927  2 Sheets-Sheet 1

Inventor
William G. Newton
By Rockwell & Bartholow
Attorneys

March 26, 1929.　　W. G. NEWTON　　1,706,630
REGULATING VALVE
Filed June 9, 1927　　2 Sheets-Sheet 2

Inventor
William G. Newton
By Rockwell & Bartholow
Attorneys

Patented Mar. 26, 1929.

1,706,630

UNITED STATES PATENT OFFICE.

WILLIAM G. NEWTON, OF NEW HAVEN, CONNECTICUT, ASSIGNOR TO THE PECK BROTHERS & COMPANY.

REGULATING VALVE.

Application filed June 9, 1927. Serial No. 197,604.

This invention relates to regulating and transfer valves, and more particularly to an arrangement of valve mechanism adapted to regulate the supply of hot and cold water furnished either to a bath tub or a shower bath.

In the shower bath and bath tub installations generally in use, it is the practice to provide separate valves controlled by individual handles for the hot and cold water, which is subsequently passed into a mixing chamber, and then through a common discharge pipe or connection into a shower bath or bath tub. It has been proposed to use a single handle for simultaneously effecting the control of the hot and cold water valves, and in my Patent No. 1,071,454, of August 26, 1913, I have disclosed a valve mechanism suitable for this purpose. The present invention is, in general, an improvement on mixing and regulating valves of this character.

If the hot water being supplied to a shower bath is of high enough temperature, it is possible with the ordinary fixtures for a bather to be scalded by hot water passing through the mixing chamber before being sufficiently tempered by cold water. In order to prevent this danger, it is to be preferred that the cold water be turned on first, and then tempered by the introduction of hot water. As an object of my invention, I contemplate a mixing valve mechanism for hot and cold water having a single control handle in which the cold water is turned on and flows freely through the mixing chamber before the hot water is turned on.

A further object of my invention is to provide a mixing valve for controlling the relative amounts of hot and cold water delivered to a bath tub or shower bath in which the quantity of cold water flowing through the valve will decrease as the amount of hot water is increased, or vice versa, and in which it is possible to exclude the passage of either or both, if desired.

Shower baths are generally used as an adjunct to a bath tub, which is generally provided with a spout and valves for controlling the introduction of hot and cold water directly to the tub. My improved regulating valve is suitable for use with either a bath tub or a shower bath, but in order that the mechanism may not have to be duplicated where a shower bath is used with a bath tub, I propose as a still further object of my invention to use a single regulating valve, in conjunction with a transfer valve, the latter being adapted to direct the water from the mixing valve either into the shower bath or directly into the tub, through a spout used in connection with the latter.

As still another object of my invention, I contemplate a novel form of spout for a bath tub having a transfer valve built therein and adapted to direct the flow of water either through the spout into the bath tub or into a pipe leading to the shower bath.

To these and other ends, the invention consists in the novel features and combination of parts to be hereinafter described and claimed.

Figure 1:
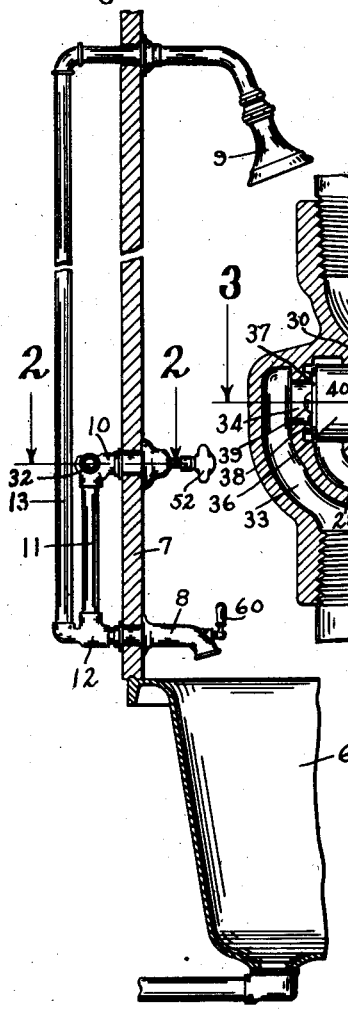
Fig. 1 is a general view, showing preferred forms of my improved mixing valve and transfer valve used in connection with a bath tub and shower bath.

Referring to the drawings in which I have shown a preferred embodiment of my invention, the reference numeral 6 indicates a bath tub built into a wall 7 of a room in which the bath tub is placed, and mounted on wall 7 over one end of bath tub 6 is an overrim spout 8, and a shower bath 9, the supply of water to which is controlled by a mixing valve 10, connected by a pipe 11 to a transfer valve 12 which is adapted, in a manner to be hereinafter fully described, to direct water to the shower bath 9, through pipe 13, or directly into the spout 8.

The mixing valve 10 has formed integrally therewith a threaded sleeve 14, secured in the wall 7 by nuts 15 and 16, and received within the outer end of sleeve 14 is a spindle sleeve 17 having a threaded end 18 engaging complemental internal threads provided in the sleeve 14. Supported in sleeve 17 is a spindle 19, having an enlarged threaded head 20, received in the interior of sleeve 14, which is provided with complemental internal threads at an intermediate point indicated by the reference numeral 21. In the opposite end of the spindle 19 from the spindle sleeve 17 is a shut off valve 22 having a threaded end 23, secured in the outer end of the spindle 19 and in the outer end of the valve 22 is annular valve packing 24, secured in place by packing sleeve 25.

In the valve casing 10 adjacent the packing 24 is a valve seat 26, surrounding a port 27, leading to a water passage 28, which is connected by port 29 to a cold water passage 30 and cold water inlet 31. On the opposite side of the casing from the cold water inlet 31 is a hot water inlet 32, connected to a passage 33, having at the inner end thereof a port 34, leading into the passage 28.

Supported in the valve 22 is a stem 35 having on the outer end thereof an enlarged head 36, provided on its outer end with disk packing 37, cooperating with valve seat 38, and secured in place by packing screw 39, while the inner end of head 36 is beveled, as indicated by the reference numeral 40.

The inner end of the stem 35 extends through valve 22 into the spindle head 20, which is provided with a recess 20ª, and on the stem 35 within the recess 20ª is a collar 41, held against shoulder 35ª of stem 35 by a pin 42. Bearing against this collar 41 is a spring 43 received within the recess 20ª of the spindle head 20. The interior of the valve casing 10, adjacent the valve 22, is enlarged, as indicated by the reference numeral 45, and connected to this enlarged portion is an outlet passage 46, communicating with the transfer valve through the pipe 11.

The spindle sleeve 17 has therein a packing gland 48, and secured to the packing gland, and extending outwardly therefrom, is a threaded sleeve 49, having mounted thereon an escutcheon ring 50, securing an escutcheon 51 against the wall 7 and covering the protruding parts of the valve 10. Upon the outer end of the spindle 19 is a handle 52.

The transfer valve 12 comprises a bath tub outlet 53, having mounted therein a sleeve 54, secured in the wall 7 by a nut 55 and the spout 8, which has a threaded portion 56, mounted on the sleeve 54, and a flange 57 bearing against the wall 7. Within the spout 8 and the sleeve 54 is a valve spindle 58, having a bearing 59 in the outer end of the spout 8, and provided at this end with a handle 60. The opposite end of the spindle 58 is threaded, as shown at 61, for the reception of a duplex valve 62, having a threaded outer surface 63, received within an internally threaded stud provided interiorly of the casing of the valve 12. One end of the valve 62 is provided with a beveled edge 65, cooperating with the valve seat 66, for controlling the flow of water to the pipe 13, while the opposite end of the valve 62 has a beveled end 67, cooperating with a valve seat 68, to control the supply of water to the spout 8 through the port 69.

Figure 2:
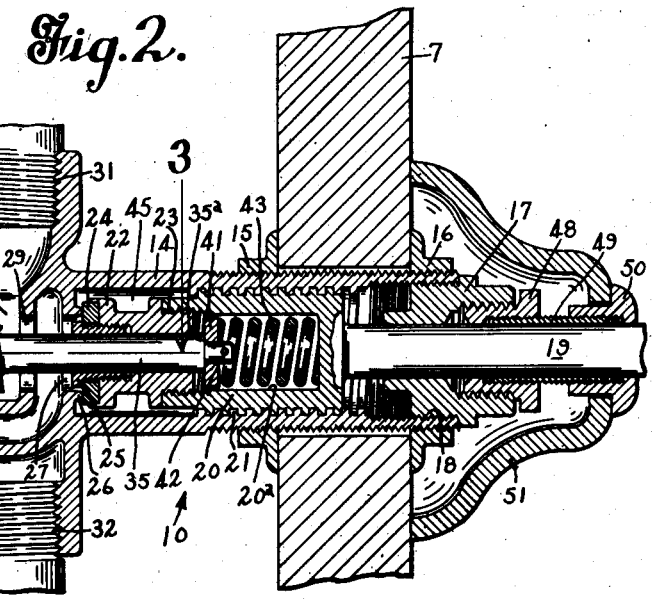
Fig. 2 is a cross-sectional view of the mixing valve taken along the line 2—2 of Fig. 1.
Figure 3:
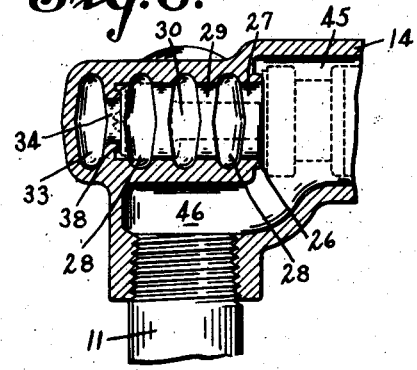
Fig. 3 is a sectional view taken along the line 3—3 of Fig. 2, and showing the arrangement of the fluid passage adjacent the mixing chamber.

As shown in Fig. 2 of the drawings, the hot water valve 37 and the shut off valve 22 are both seated. Upon rotation of the handle 52, the spindle 19 is rotated and moved outwardly through the engagement of the threaded portion 20 and the complemental threads provided in the sleeve 14. This movement of the spindle carries the valve 22 away from the valve seat 26, allowing cold water to flow from the cold water passage 30 through the ports 29 and 27 into chamber 45, where it passes through outlet 46 into pipe 11, and thence to the transfer valve. The spring 43 keeps the valve 37 seated until the collar 41 is picked up by the valve 22, whereupon the valve 37 will be unseated and hot water allowed to flow through the hot water passage 33, port 34, into passage 28 and through the port 27 to the chamber 45, where it will mix with the cold water to temper the latter. Upon the continued rotation of the handle 52, the opening of the hot water valve is increased, while the beveled face 40 of the enlarged portion 36 of the stem 35 approaches the port 29 to cut down the supply of cold water. By adjusting the positions of the valve 37 and the beveled face 40, it is possible to regulate the respective amounts of hot and cold water introduced to the mixing chamber, or even to cut off the supply of cold water by bringing the enlarged portion 36 of the stem 35 into and closing the port 29.

Figure 4:
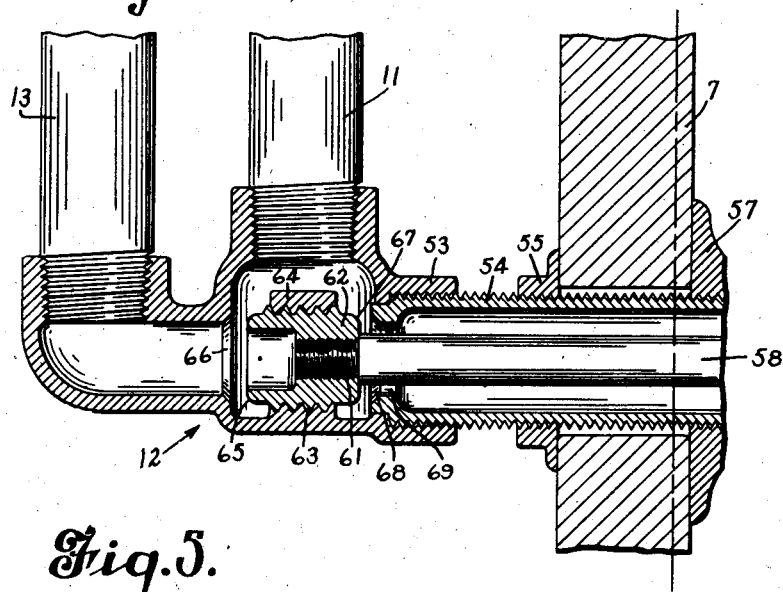
Figs. 4 and 5 are views, in section, of the transfer valve, showing the interior arrangement thereof.
Figure 5:
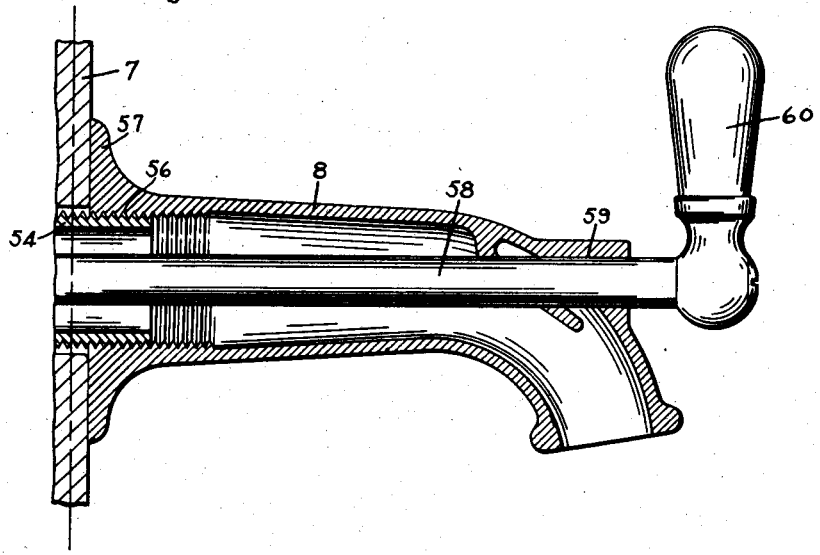

The water passing through pipe 11 to the transfer valve 12 may be directed to either the bath tub or shower bath by the position of the handle 60. As shown in Fig. 4, the handle 60 is adjusted so that water may pass to either the spout of the bath tub or shower bath. By rotating the handle in one direction, the beveled edge 67 of the valve 62 will be seated on valve seat 68, preventing the flow of water through spout 8, and sending all the water through pipe 12 to the shower bath. Rotation of the handle in the opposite direction will seat the beveled edge 65 of the valve 62 against the valve seat 66, whereupon the water will flow through the port 69 into spout 8, and thence into the bath tub.

From the above description it will be readily understood that when the shut off valve 22 is seated the hot water valve 37 is seated and the cold water valve 40 wide open. Thus when the shut off valve 22 is opened cold water flows through the port 27 until the stem 19 has been moved far enough for the collar 41 to move the hot water valve from its seat. Movement of the hot water valve away from its seat causes the cold water valve to approach the port 29 and diminish the amount of cold water. By adjusting the position of the stem 19 by means of handle 52 it is possible to temper the water to suit the bather.

In use the transfer valve 12 may be set to direct the water into the spout 8 of the bathtub and then the water turned on and tempered by means of the handle 52 of the mixing valve 10. When the temperature of the water is satisfactory to the bather, the transfer valve 12 may be changed to direct the flow to the shower bath 9.

While I have shown the transfer valve built into an overrim spout, it is to be understood that the same is not limited thereto, but may be used with other types of spouts; and while I have shown and described a preferred embodiment of my invention, it will be understood that the same is not limited to all the details shown but is capable of modification and variation within the spirit of the invention and the scope of the appended claims.

What I claim is:

1. In a mixing valve, a casing, an outlet port in said casing, a shutoff valve in said casing cooperating with said outlet port to control the flow of water therethrough, a stem for said valve, a handle on said stem, a second stem mounted in said first stem, a lost motion connection between said stems, hot and cold water valves on said second named stem, hot and cold water ports in said casing within which said last named valves cooperate, a passage between said hot and cold water ports and said outlet port, and means for urging said second named stem and said hot water valve towards the hot water port.

2. In a mixing valve, a casing, said casing being provided with an outlet port, a shutoff valve cooperating with said outlet port to control the flow of water therethrough, a stem for said valve, a handle on said stem, a second stem mounted in said first stem, a lost motion connection between said stems, hot and cold water valves on said second named stem, hot and cold water ports with which said valves cooperate, a passage between said hot and cold water ports and said outlet port, and a spring cooperating with said second named valve stem to hold said hot water valve seated until said shutoff valve has been opened a predetermined amount.

3. In a mixing valve, a casing, said casing being provided with an outlet port, a shutoff valve cooperating with said outlet port to control the flow of water therethrough, a stem for said valve, a handle on said stem, a second stem mounted in said first stem, hot and cold water valves on said second stem, said casing being provided with hot and cold water ports with which said hot and cold water valves cooperate, a passage between said hot and cold water ports and said outlet port, a recess in said shutoff valve stem, said second named stem extending into said recess, a spring in said recess adapted to cooperate with said second named stem to urge said second named stem towards said hot water port, and means for limiting the movement of said stem towards said port.

4. In a mixing valve, a casing, said casing being provided with an outlet port, a shutoff valve cooperating with said outlet port to control the flow of water therethrough, a stem for said valve, a handle on said stem, a second stem mounted in said first stem, hot and cold water valves on said second stem, said casing being provided with hot and cold water ports within which said hot and cold water valves cooperate, a passage between said hot and cold water ports and said outlet port, a recess in said shutoff stem, said second named stem extending into said recess, a spring in said recess adapted to cooperate with said second named stem to urge said second named stem towards said hot water port, and means carried within said recess for limiting the movement of said second named stem towards said hot water port.

5. In a mixing valve, a valve casing, a hot water port in said casing, a cold water port in said casing in alignment with said hot water port, a common discharge passage connected with said ports, a stem, a head on said stem having on one end a hot water valve and on the other end a cold water valve, said head being adapted to reciprocate between said ports to control the ratio of water flowing therefrom, and means for reciprocating said stem.

6. In a mixing valve, a valve casing, a hot water port in said casing, a cold water port in said casing, in alignment with said hot water port, a stem, a head on said stem having on one end a hot water valve and on the other end a flat face inclined with respect to the axis of the stem cooperating with said cold water port to control the flow of water therethrough, said head being adapted to reciprocate between said ports to control the ratio of water flowing therefrom, and means for reciprocating said stem.

7. In a mixing valve, a valve casing, a hot water port in said casing, a cold water port in said casing, a discharge port in said casing, said ports being in alignment, a hot water valve cooperating with said hot water port, a cold water valve cooperating with said cold water port, and a shutoff valve cooperating with said discharge port, and a single handle for controlling the movement of said valves.

8. In a mixing valve, a valve casing, a hot water port in said casing, a cold water port in said casing, a discharge port in said casing, said ports being in alignment, a hot water valve cooperating with said hot water port, a cold water valve cooperating with said cold water port, a shutoff valve cooperating with said discharge port, a single handle for controlling said valves, and connections between said handle and valves, said connections being adapted to permit said shutoff valve to be opened while said hot water valve is maintained shut.

In witness whereof, I have hereunto set my hand this 7th day of June, 1927.

WILLIAM G. NEWTON.